United States Patent [19]

Lemper et al.

[11] 4,137,278

[45] Jan. 30, 1979

[54] MELT POLYMERIZATION PROCESS AND LINEAR AROMATIC POLYESTERS PREPARED THEREFROM

[75] Inventors: Anthony L. Lemper, Amherst; Jerold C. Rosenfeld, Tonawanda, both of N.Y.

[73] Assignee: Hooker Chemicals & Plastics Corp., Niagara Falls, N.Y.

[21] Appl. No.: 818,493

[22] Filed: Jul. 25, 1977

Related U.S. Application Data

[63] Continuation-in-part of Ser. No. 542,635, Jan. 20, 1975, abandoned.

[51] Int. Cl.² ............................................. C08L 67/00
[52] U.S. Cl. .................................................. 260/860
[58] Field of Search ............................ 260/47 C, 860

[56] References Cited

U.S. PATENT DOCUMENTS

| | | | |
|---|---|---|---|
| 3,299,172 | 1/1967 | Schade et al. | 260/860 |
| 3,413,379 | 11/1968 | Schade et al. | 260/47 |
| 3,427,267 | 2/1969 | Stieger et al. | 260/22 |

*Primary Examiner*—V. P. Hoke
*Attorney, Agent, or Firm*—Peter F. Casella; James F. Mudd

[57] ABSTRACT

Linear aromatic polyesters are produced by the melt polymerization process by mixing a bisphenol, a diaryl ester of a dicarboxylic acid and an oligomeric polyester comprised of an aliphatic glycol and a dicarboxylic acid and reacting the mixture in the presence of a transesterification catalyst.

18 Claims, No Drawings

MELT POLYMERIZATION PROCESS AND LINEAR AROMATIC POLYESTERS PREPARED THEREFROM

REFERENCE TO PRIOR APPLICATION

This is a continuation-in-part of application Ser. No. 542,635, filed Jan. 20, 1975, now abandoned.

BACKGROUND OF THE INVENTION

Polyesters made from aromatic dicarboxylic acids and diphenolic compounds are particularly well known for their suitability for molding, extrusion and solvent casting applications. Among the many methods known for preparing such polyesters, the reaction of the dihalide of the dicarboxylic acid with the diphenol in the presence of an acid binding medium in the well known "interfacial" and solution methods are the most common. The reaction between a dialkyl ester of the dicarboxylic acid and a diphenolic compound is slow and requires long heating times because of the lack of reactivity of phenolic hydroxyls in general toward the dialkyl ester; moreover, polyesters formed in this manner are usually of low molecular weight and because of the long heating periods necessary, have a tendency to be badly degraded and discolored. It is further known that the slowness of the reaction and long heating times can be eliminated by using a diaryl ester instead of the dialkyl ester of the dicarboxylic acid. See, e.g., British Pat. No. 924,607.

The polyaryl esters produced by the transesterification and polycondensation of the diaryl esters of aromatic dicarboxylic acids and dihydric phenols have such high melting viscosities that the degree of polycondensation required for obtaining good mechanical properties cannot be reached in conventional stirred tank reactors. For the purpose of eliminating this disadvantage, it has been proposed heretofore to replace a part of the dihydric phenols with equivalent amounts of glycols. In U.S. Pat. No. 3,399,170 Blaschke et al. prepared polymers from a diaryl ester, a bisphenol and a glycol. However, this process has the disadvantages of poor reducibility and the necessity that the reactants be present in an exactly stoichiometric proportion with respect to each other.

The use of a "prepolymer" in preparing linear aromatic polyesters is not new. For example, Shatz et al. (U.S. Pat. No. 3,498,950) teach reacting a difunctional aliphatic modifier such as glycol with an excess of diacid halide followed by reacting the resulting "prepolymer" with a bisphenol. Schade et al. in U.S. Pat. Nos. 3,299,172 and 3,413,379, teach reacting diaryl esters of the aromatic dicarboxylic acids with dihydric phenols until the polyester produced has a melting viscosity above about 2000 poise and then adding a linear thermoplastic polyester consisting of terephthalic acid units, isophthalic acid units or mixtures thereof as well as residues of di-primary di-alcohols and then continuing the polycondensation until the product has a specific viscosity of about 0.7 or more. Schade et al. observed that if the di-alcohol polyester is added to the reaction mixture at the beginning or even after the completion of the transesterification, mixed polyesters are obtained which are relatively brittle despite a high degree of polycondensation, and do not display any advantageous properties apart from their softening point.

In contrast to Schade et al., we have discovered that linear aromatic polyesters having appropriate properties for molding, extruding and solvent casting applications can be obtained by transesterification and polycondensation of mixtures of diaryl esters of dicarboxylic acids, dihydric phenols and an oligomer of a dicarboxylic acid and a diol. High impact polyesters can be produced by the process of this invention.

Accordingly, it is the object of this invention to provide a new method for producing linear aromatic polyesters suitable for molding, extrusion and solvent casting applications and they thereby provide a new and useful linear aromatic polyesters. These and other objects of the invention will become apparent to those skilled in the art from the following detailed description.

SUMMARY OF THE INVENTION

This invention relates to linear aromatic polyesters and the method by which they are prepared. More particularly, the invention relates to linear aromatic polyesters which are prepared by the melt transesterification and polycondensation of a bisphenol, a diaryl ester of dicarboxylic acid and an oligomer of a dicarboxylic acid and a diol.

DESCRIPTION OF THE PREFERRED EMBODIMENTS

In accordance with the present invention, linear aromatic polyesters are prepared by first mixing a bisphenol, a diaryl ester of dicarboxylic acid and an oligomer of a dicarboxylic acid and a diol, and then reacting the resulting mixture in the presence of a transesterification catalyst.

The bisphenols which can be used in the process of this invention correspond to the general formula:

$$\mathrm{HO-Ar-(E)_x-Ar-OH} \atop {\phantom{HO-}|\phantom{Ar-}|\phantom{(E)_x-}|} \atop {\phantom{HO-}T_b\phantom{Ar-}G_m\phantom{(E)_x-}T'_b}$$

wherein Ar is aromatic, preferably containing 6–18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, and halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—,

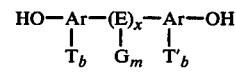

or GN<; T and T' are independently selected from the group of halogen, such as chlorine or bromine, G or OG; m is an integer from 0 to the number of replaceable hydrogen atoms on E; b is an integer from 0 to the number of replaceable hydrogen atoms on Ar, and x is 0 or 1. When there is a plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms and preferably 12 to about 25 carbon atoms.

Typical examples of bisphenols having the foregoing formula include bis(4-hydroxyphenyl)methane, bis(2-hydroxyphenyl)methane, 4-hydroxyphenyl, 2-hydroxyphenyl methane and mixtures thereof; bis(3-methyl-4-hydroxyphenyl)methane, bis(4-hydroxy-3,5-dichlorophenyl)methane, bis(4-hydroxy-3,5-dibromophenyl)methane, bis(4-hydroxy-3,5-difluorophenyl)methane, bisphenol-A[bis(4-hydroxyphenyl)-2,2-propane], bis(3-chloro-4-hydroxyphenyl)-2,2-propane, bis(4-hydroxy-3,5-dichlorophenyl)-2,2-propane, bis(4-hydroxynaphthyl)-2,2-propane, bis(4-hydroxyphenyl)phenyl methane, bis(4-hydroxyphenyl)diphenyl methane, bis(4-hydroxyphenyl)-4'-methyl phenyl methane, bis(4-hydroxyphenyl)-4'-chlorophenyl methane, bis(4-hydroxyphenyl)2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxyhaphthylenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-terbutylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyldiphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)propane; 4,4'-(cyclohexymethylene) bis(2,6-dichlorophenol); 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl)-hexane, 4,4'-dihydroxy-3,3', 5,5'-tetra-chlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propane, tetrachlorodiphenylolsulfone, bis(3,5-dibromo-4-hydroxyphenyl)-phenyl phosphine oxide, bis(3,5-dibromo-4-hydroxyphenyl)-sulfoxide, bis(3,5-dibromo-4-hydroxyphenyl)-sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4,4'-hydroxy biphenyl. Representative biphenols are o,o-biphenol, m,m'biphenol; p,p'-biphenol; bicresols, such as 4,4'-bi-o-cresol, 6,6-bi-o-cresol, 4,4'-bi-m-cresol; dibenzyl biphenols such as a,a'-diphenol-4,4'-bi-o-cresol; diethyl bisphenols such as 2,2'-diethyl-p,p;-biphenol, and 5,5'-diethyl-o,o-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol. Mixtures of isomers of the foregoing bisphenols can be used.

The diaryl esters of dicarboxylic acids which are employed in this invention are the diaryl terephthalates and the diaryl isophthalates.

The preferred aryl ester is the phenyl ester but other aryl esters, e.g., the cresyl esters can also be used but they are usually more expensive to prepare. In general, the aryl moieties R and R' will contain 6 to 10 carbon atoms. Included in the aryl esters are those derived from alkylphenols, such as cresol, xylenol and the like; the halophenols such as parachlorophenol, 3,5-dichlorophenol, 3,5-dibromophenol, and the like; nitrophenols such as para-nitrophenol and the like. The aryl esters can be derived from the corresponding thiophenols.

The oligomer employed in this invention is the transesterification and polycondensation product of a dialkyl ester of dicarboxylic acid and a dihydric alcohol. The dialkyl esters have the formula:

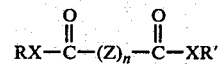

in which R and R' are the same or different alkyl groups; X is oxygen or sulfur, Z is alkylene, —Ar— or —Ar—Y—Ar Where Ar has the same definition as given with respect to the bisphenols, Y is alkylene, of 1 to 10 carbons, haloalkylene, —O—, —S—, —SO—, —SO$_2$—, —SO$_3$—, —CO—,

or GN<; and n is 0 or 1. atoms. The alkyl groups are preferably alkyl groups of 1 to 10 carbon atoms such as methyl, ethyl, propyl, heptyl, octyl and nonyl. The dicarboxylic acids are those disclosed hereinbefore.

Suitable dicarboxylic acids from which the dialkyl esters are derived (i.e., where R and R' are hydrogen) include aromatic dicarboxylic acids such as phthalic acid, isophthalic acid, terephthalic acid, oxalic acid, bis(4-carboxy)-diphenyl, bis(4-carboxyphenyl)-ether, bis(4-carboxyphenyl) sulfone, bis(4-carboxyphenyl)-carbonyl, bis(4-carboxyphenyl)-methane, bis(4-carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1,1-dimethyl propane, 1,1- and 2,2-bis(4-carboxyphenyl)-butane, 1,1- and 2,2-bis(4-carboxyphenyl)-pentane, 3,3bis(4-carboxyphenyl)-heptane, 3,3-bis(3-carboxyphenyl)-heptane, and aliphatic acids such as oxalic acid, adipic acid, succinic acid, malonic acid, sebacic acid, glutaric acid, azelaic, suberic acid and the like. Isophthalic acid and terephthalic acid are preferred because of their availability and low cost.

The dihydric alcohols employed in preparing the oligomer can contain 2 to about 100 carbon atoms, and preferably 2 to about 20 carbon atoms. Typical examples include ethylene glycol, diethylene glycol, triethylene glycol, tetraethylene glycol, polyethylene glycol, propylene glycol, dipropylene glycol, polypropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, 1,4-butanediol, 1,3-butylene glycol, neopentyl glycol, 1,2-dimethyl-1,2-cyclopentanediol, 1,2-cyclohexanediol, 1,2-dimethyl-1,2-cyclohexanediol, and polyester glycols such as polydecamethylene sebacate, and aryl alkylene glycols such as oxyalkylated bisphenol A, and mixture thereof. Minor proportions of monohydric and polyhydric alcohols can be employed to control molecular weight.

The oligomer can be prepared in accordance with processes known in the art, e.g., by mixing and heating the aliphatic diol with the dialkyl ester of a dicarboxylic acid in the presence of a transesterification catalyst. Since the reaction is stoichiometric and therefore stoichiometric proportions of the dialkyl ester and diol can be employed, we prefer to use an excess of diol in preparing the oligomer because the diol is generally the more volatile of the two components. We also prefer to conduct the reaction under nitrogen or a vacuum up to about 0.1 millimeter of mercury.

In preparing the linear aromatic polyesters of the present invention, the three components are subjected to the melt polycondensation and transesterification procedure which is well known in the art. That is, the diaryl ester, bisphenol and oligomer are placed in an appropriate reaction vessel, such as a stirred tank reactor or agitated thin film reactor, with the appropriate catalyst and, if desired, stabilizing agents and heated to reaction temperature which is generally about 150° C. to 380° C. and preferably about 190° to 330°. The linear aromatic polyester thus produced is thereafter recovered. The diaryl ester of an aromatic carboxylic acid and the hydroxyl component (bisphenol and oligomer) are employed in stoichiometric proportions although either component can be present in an excess of up to about 120% but preferably about 5%. Within the hydroxyl component, the ratio of the bisphenol to oligomer can vary from 95:5 to 15:85 but is preferably about 1:1, in the final polymer.

The transesterification and polycondensation catalysts employed in the present invention are well known to those skilled in the art and any of the known catalysts can be employed. Examples of such catalysts include alkali metal and alkaline earth metal phenylates, magnesium oxide, lead oxide, zinc oxide, antimony trioxide, alkali metal alkoxides, titanates, metallic hydrides and borohydrides such as lithium hydride and potassium borohydride, alkali metal hydroxides and alcoholates. At the present time, we prefer to use lithium hydride or lithium phenoxide as the catalyst. Illustrative stabilizers include, but are not limited to, aryl phosphites, alkyl phosphites, and mixed alkyl aryl phosphites.

The properties oligomers and polyesters of this invention are improved by excluding oxygen from the reaction vessels, therefore, an inert gas or vacuum is employed to exclude oxygen. Nitrogen is the most convenient although other inert gases, such as argon, helium and neon, or mixtures of inert gases can be used. Also vacuum, from about 0.1 to 30 inches of mercury, is advantageous to aid in the removal of by-products.

The type of product produced by the processes of the invention is dependent on the degree of polymerization (d.p.) of the oligomer. Generally, the use of linear molecular weight oligomers with a lower degree of polymerization, for example of 1 or 2 up to about 8, results in polymers having high impact strength, lower melt viscosity and which are suitable for injection molding and extrusion processes. The use of the oligomers which have a higher degree of polymerization, such as 8 or above, for example, up to about 20, result in novel polymers having unique structures and which have higher heat distortion temperatures, higher melt viscosities and improved chemical resistance. These polymers are better suited to extrusion as a method of shaping the polymer. The polymers produced by the process of the invention generally have an intrinsic viscosity of at least 0.5 dl/g when measured in sym-tetrachloroethane at 25° C., preferably at least about 0.6 dl/g.

Considerable influence on the properties of the polymers produced by the processes of the invention is exerted by the glycol employed. Thus, the use of a more rigid diol such as ethylene glycol results in the production of a polymer having a higher melt viscosity for the same degree of polymerization as neopentyl glycol. The polymeric diols such as the polyether glycols and polyester glycols result in the production of elastomer type products when the degree of polymerization is at a level of 8 or more. Thus the processes of the invention have expanded the horizons of the types of products obtainable with the aromatic polyesters of the bisphenol type.

The following examples are set forth in order to further illustrate the invention. Throughout this specification and claims, all temperatures are in degrees centigrade and all parts and percentages are by weight unless otherwise specified.

EXAMPLE 1

Preparation of Hydroxyl End Capped Oligomer 369.1 g (3.55 mols) of neopentyl glycol (dried at 70° C. for 16 hours in a vacuum oven), 326 g (1.68 mols) of dimethyl terephthalate and (0.16 g tetrabutyl titanate) were charged into a 1-liter, three-necked, round bottom flask equipped with a nitrogen inlet, mechanical stirrer, and a 6" Vigreux column with a head, condenser and graduated collector (for the by-product methanol). The catalyst employed was tetrabutyl titanate in an amount of 0.16 g (0.05% based on the weight of the dimethyl terephthalate).

A slow nitrogen flow was begun and the reaction vessel was heated with stirring at about 200° C. for 6 hours. Approximately 96% of the theoretical methanol was collected. The Vigreux column was then removed, the head was put directly on the flask and an adapter connected it to a three-necked flask with a stopper in the middle and an outlet for a vacuum pump. The reaction was continued at about 200° C. and vacuum was applied. After 1.3 hours, the vacuum was 1 mm of mercury and 162 g of the neopentyl glycol was in the trap. The reaction mixture was then poured into a glass pan and allowed to cool to room temperature.

The resulting product was a clear, water-white, brittle solid which could be ground up. The hydroxyl number determined in pyridine and acetic anhydride was determined to be 66.3 mg KOH/g and the molecular weight of the oligomer, calculated from this hydroxyl number, was 1692.

EXAMPLE 2

Preparation of Linear Aromatic Polyesters

Into an oil-jacketed reactor equipped with a stirrer, nitrogen inlet, and a trap with an outlet for establishing a vacuum, were charged the following reactants:

| | |
|---|---|
| 20.62 g (0.0904 mol) | bisphenol-A |
| 20.0 g (0.0119 mol) | oligomer of Example 1 |
| 32.56 g (0.1025 mol) | diphenyl terephthalate |

The system was flushed with nitrogen and 2 drops (about 26 mg) of tetrabutyl titanate was added to the reactor.

The reaction mixture was heated to 260° C. over about a 15-minute period with stirring and upon reaching that temperature, evacuation of the system was begun. The phenol came out rapidly under the vacuum and the reaction mixture was orange and clear and low viscosity. The maximum vacuum was reached (0.05–0.25 mm) after 1 hour. After a total time at 260° C. of about 4 hours, the temperature was raised to 290° C. while maintaining maximum vacuum. After 1 hour at the higher temperature, the polymer was removed and cooled to room temperature.

The resulting polymer was clear, tough and had an intrinsic viscosity of 0.805, in $CHCl_2CHCl_2$ at 25° C., and a Tg measured in the Perkin Elmer DCS-2 at 10° C. per minute was 126°–135° C.

The linear aromatic polymer thus produced was molded at 300° C. in a Minimax Molder and then tested in a high speed tensile impact tester (both instruments produced by Custom Scientific Instruments, Inc.). Values of about 8 inch/pounds were obtained as compared to 2.3 for Lustrex HF-77 polystyrene (which has 0.3 foot/pound notched Izod impact strength), 4.3 for Blendex 101 ABS (which has 8 foot/pounds notched Izod impact strength) and approximately 10.2 for polycarbonate, (which has 16 foot/pounds notched Izod impact strength). These test results demonstrate that the linear aromatic polyester produced is a high impact polymer.

EXAMPLES 3–4

Examples 1 and 2 were repeated using zinc acetate $0.2H_2O$ and antimony oxide, respectively, as the catalyst in place of the tetrabutyl titanate. The resulting linear aromatic polyesters had a pale yellow color.

EXAMPLES 5–6

Following the procedure of Example 1, a hydroxyl end capped oligomer was prepared from dimethyl terephthalate and polyethylene glycol. The procedure of Example 2 was then repeated employing this oligomer in place of the neopentyl glycol-dimethyl terephthalate oligomer to produce a thermoplastic linear aromatic polyester having an intrinsic viscosity greater than 0.5, and having rubbery characteristics, good dimensional stability at elevated temperatures, good oxidative stability and chemical and solvent resistance.

EXAMPLE 7

A. An oligomer was prepared by reacting 6.35 mols of neopentyl glycol with 3.01 moles dimethyl terephthalate and 0.29 gm zinc acetate $0.2H_2O$ under a slow flow of nitrogen at 168° to 199° C. over about 4 hours during which time 221 mols of methanol were removed. An additional 294 gm of mainly neopentyl glycol was removed at 188° to 224° C. and gradually increasing vacuum from about 200 to 0.15 mm Hg over 1.8 hours. The clear water white oligomer was poured into a tin foil lined glass tray where it cooled to a brittle, clear solid. The hydroxyl number of this oligomer was determined to be 50.8 indicating a molecular weight of 2208.

B. 20.62 gm (0.0905 mols) bisphenol-A, 20.0 gm (0.0090 mols) of the above oligomer, 31.64 gm (0.0995 mols) of diphenyl terephthalate and 0.16 gm lithium hydride were reacted together at 260° C. for 5.75 hours with stirring and under vacuum ranging from about 200 mm initially to 0.15 mm Hg finally. The polymer removed from the reactor is clear, yellow and tough. 18.38 gm or about 98.3% of the theoretical phenol was recovered (and identity confirmed by nmr in $CDCL_3$). The intrinsic viscosity of the polymer ($CHCl_2$-$CHCl_2$, 25° C.) is 0.996. The Tg determined as in Example 2 was 130°–137° C. The polymer was molded and tested for microtensile impact as described above and gave a value of 6.3 inch-lb, i.e., relatively high impact.

EXAMPLE 8

An oligomer was prepared as in the above example with 10.45 mols neopentyl glycol, 4.937 moles dimethyl terephthalate and 0.48 gm tetrabutyl titanate. Approximately 400 mls of methanol and 353 gm neopentyl glycol were recovered. The oligomer was clear, water white and brittle and found to have a hydroxyl number of 135, i.e., MW 832.

0.0452 mole bisphenol-A, 0.0120 moles of the above oligomer, 0.0572 moles diphenylterephthalate and 0.13 gm (1 drop) tetrabutyl titanate were reacted at 4 hours at 260° C. and 1 hour at 290° C. with stirring and under a vacuum which was gradually increased to 0.1 mm Hg. 10.7 gm (99.5% of theory) phenol was recovered. The intrinsic viscosity of the polymer ($CHCl_2CHCl_2$, 25° C.) is 0.58. The polymer is clear and tough.

EXAMPLE 9

An oligomer was prepared from 3.55 moles neopentyl glycol, 1.68 moles dimethyl terephthalate and 0.16 gm tetrabutyl titanate as described above. 129 mls methanol and 162 gm neopentyl glycol were recovered. The oligomer was clear and brittle and found to have a hydroxy number of 66.3 and a corresponding molecular weight of 1692.

0.0904 moles bisphenol-A, 0.0119 moles of the above oligomer, 0.1025 moles diphenyl terephthalate and 0.026 gm (2 drops) of tetrabutyl titanate were reacted at 260° C. (approx. 3.5 hours) and 290° C. (approx. 1.5 hours) with stirring and under a gradually increasing vacuum (max. = 0.1 mm Hg). 17.1 gm or 88.8% of the theoretical phenol was recovered. The polymer is clear and tough. Intrinsic viscosity: 0.805 ($CHCl_2CHCl_2$, 25° C.).

EXAMPLE 10

0.905 moles bisphenol-A, 0.0090 moles of the oligomer from Example 7, 0.995 moles diphenyl terephthalate and 0.32 gm antimony oxide were reacted together at 300° C. for approximately 5 hours with stirring and under a gradually increasing vacuum (finally 1 mm Hg). The product is clear, yellow and tough. Intrinsic viscosity: 0.679 ($CHCl_2CHCl_2$, 25° C.). The Tg as determined in Example 2 was 123°–132° C. GPC: $M_w/M_m$ = 64,000/19,900 = 3.22. The polymer was molded and found to have a tensile impact of 1.81 inch-pound.

EXAMPLE 11

3.14 mols neopentyl glycol, 1.43 mols dimethylterephthalate and 0.14 gm (12 drops) tetrabutyl titanate were reacted together as described above. Approximately 92 gm methanol and 167 gm neopentyl glycol were removed. The product is clear, very light and brittle. Based on the amount of neopentyl removed, the MW was estimated at 4600 which corresponds to a degree of polymerization of 19.2, i.e., about 20.

45 grams of the above oligomer and 0.26 gm (2 drops) of tetrabutyl titanate were reacted at 265° C. for 3.5 hours with stirring and a vacuum of 1 mm Hg. At this point the vacuum was released with dry nitrogen gas and 0.193 mols bisphenol-A, 0.193 mols diphenyl terephthalate and 0.026 gm tetrabutyl titanate were charged to the reactor. The reaction was continued with stirring at 260° C. (1.2 hours) and 290° C. (1.1 hours) and the vacuum gradually decreased to less than 1 mm Hg. The polymer is clear and tough. Intrinsic viscosity: 0.58 in $CHCl_2CHCl_2$, 25° C.

EXAMPLE 12

An oligomer was prepared by reacting 3.292 mols neopentyl glycol with 1.646 mols dimethyl terephthalate and 0.16 gm zinc acetate $0.2H_2O$ for approximately 4 hours at 200°–240° C., during which time 124 mols of methanol was collected. The oligomer has a hydroxyl number of 304 which indicates MW of 369.

20.0 gm of the above oligomer, 20.62 bisphenol-A, 45.98 gm diphenyl terephthalate and 0.0115 gm LiH are charged to a small glass tube reactor, put under a blanket of dry nitrogen and heat (with stirring) to 260° C. for 3.3 hours during which time vacuum is applied and increased gradually to 1 mm Hg. The mixture is then heated to 290° C. for 1.5 more hours under full vacuum. The polymer is then removed from the reactor.

The polymer is clear, light yellow and very tough. The intrinsic viscosity is determined to be 0.633 in $CHCl_2CHCl_2$ at 25° C. The Tg as measured according to Example 2 was 119°–127° C. When the polymer was molded and tested as set forth in Example 2, the molded specimen exhibited an impact strength of 8.9 inch/pound.

The polymers prepared in examples 8 through 11 had the properties shown in Table I.

TABLE I

| Example | Oligomer Mole Weight | Polymer Intrinsic Viscosity[1] | Polymer Viscosity (poise) | Polymer Viscosity (Extrapolated to I.V.=0.70) |
|---|---|---|---|---|
| 8 | 832 | 0.54 | 12,900 | 46,000 |
| 9 | 1,692 | 0.75 | 123,000 | 88,000 |
| 10 | 2,208 | 0.60 | 35,500 | 76,000 |
| 11 | 5,000 | 0.49 | 58,800 | 330,000 |

[1]$CHCl_2CHCl_2$, 30° C measured on extrudate from melt viscometer

EXAMPLE 13

Following the procedure of Example 1, a hydroxyl end capped oligomer was prepared from dimethyl terephthalate and diethylene glycol. The procedure of Example 2 was then repeated employing this oligomer in place of the neopentyl glycol-dimethyl terephthalate oligomer to produce a thermoplastic linear aromatic polyester having an intrinsic viscosity greater than 0.6 and an impact strength comparable to the product of Example 2.

EXAMPLE 14

Following the procedure of Example 1, a hydroxyl end capped oligomer was prepared from dimethyl terephthalate and a mixture of 50 mole percent neopentyl glycol and 50 mole percent diethylene glycol. The procedure of Example 2 was then repeated employing this oligomer in place of the neopentyl glycol-dimethyl terephthalate oligomer to produce a thermoplastic linear aromatic polyester having an intrinsic viscosity greater than 0.6 and an impact strength comparable to the product of Example 2.

EXAMPLE 15

Following the procedure of Example 1, a hydroxyl end capped oligomer was prepared from neopentyl glycol and dimethyl isophthalate. The procedure of Example 2 was then repeated employing this oligomer in place of the neopentyl glycol-dimethyl terephthalate oligomer to produce a thermoplastic linear aromatic polyester having an intrinsic viscosity greater than 0.6 and an impact strength somewhat less than the product of Example 2.

EXAMPLE 16

Following the procedure of Example 1, a hydroxyl end capped oligomer was prepared from neopentyl glycol and a mixture of 50 mole percent dimethyl isophthalate and 50 mole percent dimethyl terephthalate. The procedure of Example 2 was then repeated employing this oligomer in place of the neopentyl glycol-dimethyl terephthalate oligomer to produce a thermoplastic linear aromatic polyester having an intrinsic viscosity greater than 0.6 and an impact strength somewhat less than the product of Example 2.

EXAMPLE 17

Following the procedure of Example 2, diphenyl isophthalate was substituted for the diphenyl terephthalate to produce a thermoplastic linear aromatic polyester having an intrinsic viscosity of greater than 0.6 dl/g and an impact strength somewhat less than that obtained in Example 2.

Various changes and modifications can be made in the process and products of this invention without departing from the spirit and the scope thereof. The various embodiments set forth herein were for the purpose of further illustrating the invention but were not intended to limit it.

We claim:

1. A melt polymerization process for the preparation of a linear aromatic polyester having an intrinsic viscosity of at least 0.5 dl/g when measured in sym-tetrachloroethane at 25° C. which comprises (a) mixing a diphenyl ester of terephthalic acid and a hydroxyl component comprising bisphenol A and an oligomer of terephthalic acid and a diol of 2 to 20 carbon atoms, said oligomer having a degree of polymerization of 1 to about 20; and (b) reacting the mixture in the presence of a transesterification catalyst at an elevated temperature; wherein the diphenyl ester component and said hydroxyl component are present in proportions from stoichiometric proportions to an excess of up to about 120 percent of stoichiometric proportion of either component; and where the weight ratio of bisphenol A to oligomer is from 95:5 to 15:85.

2. The process of claim 1 wherein the oligomer is prepared by reacting a dialkyl ester of terephthalic acid with said diol, wherein the alkyl moieties of the dialkyl ester have 1 to 10 carbon atoms.

3. The process of claim 1 wherein said diol is a 50:50 mixture of neopentyl glycol and diethylene glycol.

4. The process of claim 1 wherein said diol is diethylene glycol.

5. The process of claim 1 wherein said diol is neopentyl glycol.

6. The process of claim 1 wherein said diol is a polyalkylene ether or ester glycol.

7. The process of claim 6 wherein said diol is polyethylene glycol.

8. A process for the preparation of a linear aromatic polyester having an intrinsic viscosity of at least 0.5 dl/g when measured in sym-tetrachloroethane at 25° C. which comprises (a) mixing a diphenyl terephthalate and a hydroxyl component comprising bisphenol-A and an oligomer of terephthalic acid and neopentyl glycol having a degree of polymerization of 1 to about 20; and (b) reacting the mixture in the presence of a transesterification catalyst at a temperature of about 150° to 380° C.; wherein the diphenyl terephthalate component and said hydroxyl component are present in proportions from stoichiometric proportions to an excess of up to about 5 percent of stoichiometric proportion of either component; and wherein the weight ratio of the bisphenol to oligomer is about 1:1.

9. The process of claim 8 wherein the oligomer is prepared by reacting dimethyl terephthalate with neopentyl glycol.

10. A melt polymerization process for the preparation of linear aromatic polyesters having an intrinsic viscosity of at least 0.58 dl/g when measured in sym-tetrachloroethane at 25° C. which comprises (a) mixing a diphenyl ester of terephthalic acid, and a hydroxyl component comprising bisphenol-A and an oligomer of terephthalic acid and neopentyl glycol or polyethylene glycol, said oligomer having a degree of polymerization of 1 to about 20; and (b) reacting the mixture in the presence of a transesterification catalyst at an elevated temperature; wherein the diphenyl ester component and said hydroxyl component are present in proportions from stoichiometric proportions to an excess of up to about 120 percent of stoichiometric proportion of either component; and wherein the weight ratio of the bisphenol to oligomer is from 95:5 to 15:85.

11. The process of claim 10 wherein the glycol is neopentyl glycol.

12. The process of claim 10 wherein the glycol is polyethylene glycol.

13. The linear aromatic polyester having an intrinsic viscosity of at least 0.5 dl/g when measured in sym-tetrachloroethane at 25° C. prepared by the melt transesterification and polycondensation of a diphenyl ester of terephthalic acid, and a hydroxyl component comprising bisphenol A and an oligomer of terephthalic acid and a diol of 2 to 20 carbon atoms, said oligomer having a degree of polymerization of about 8 to about 20; wherein the diphenyl ester component and said hydroxyl component are present in proportions from stoichiometric proportions to an excess of up to about 120 percent of stoichiometric proportion of either component; and wherein the weight ratio of the bisphenol to oligomer is from 95:5 to 15:85.

14. The polyester of claim 13 wherein said diol is a polyalkylene ether or ester glycol.

15. A molded article of the composition of claim 13.

16. The linear aromatic polyester having an intrinsic viscosity of at least 0.5 dl/g when measured in sym-tetrachloroethane at 25° C. prepared by the melt transesterification and polycondensation of diphenyl terephthalate and a hydroxyl component comprising bisphenol A and an oligomer of terephthalic acid and a glycol of 2 to 20 carbon atoms having a degree of polymerization of about 8 to about 20; wherein the diphenyl terephthalate component and said hydroxyl component are present in proportions from stoichiometric proportions to an excess of up to about 5 percent of stoichiometric proportion of either component; and wherein the weight ratio of the bisphenol to oligomer is about 1:1.

17. The linear aromatic polyester having an intrinsic viscosity of at least 0.6 dl/g when measured in sym-tetrachloroethane at 25° C. prepared by the melt transesterification and polycondensation of a diphenyl ester of terephthalic acid, and a hydroxyl component comprising bisphenol-A and an oligomer of a terephthalic acid and neopentyl glycol, diethylene glycol or polyethylene glycol, said oligomer having a degree of polymerization of about 8 to about 20; wherein the diphenyl ester component and said hydroxyl component are present in proportions from stoichiometric proportions to an excess of up to about 120 percent of stoichiometric proportion of either component; and wherein the weight ratio of the bisphenol to oligomer is from 95:5 to 15:85.

18. The linear aromatic polyester having an intrinsic viscosity of at least 0.5 dl/g when measured in sym-tetrachloroethane at 25° C. prepared by the melt transesterification and polycondensation of diphenyl terephthalate and a hydroxyl component comprising bisphenol A and an oligomer of terephthalic acid and neopentyl glycol having a degree of polymerization of about 8 to about 20; wherein the diphenyl terephthalate component and said hydroxyl component are present in proportions from stoichiometric proportions to an excess of up to about 5 percent of stoichiometric proportion of either component; and wherein the weight ratio of the bisphenol to oligomer is about 1:1.

* * * * *